(12) United States Patent
Eckert et al.

(10) Patent No.: US 9,019,815 B2
(45) Date of Patent: Apr. 28, 2015

(54) SOURCE ALIVE ROUTE INJECTION

(75) Inventors: Toerless Eckert, Mountain View, CA (US); Stig Venaas, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 533 days.

(21) Appl. No.: 13/195,148

(22) Filed: Aug. 1, 2011

(65) Prior Publication Data

US 2013/0033978 A1    Feb. 7, 2013

(51) Int. Cl.
 *H04L 1/00*      (2006.01)
 *H04L 12/703*    (2013.01)
 *H04L 12/721*    (2013.01)
 *H04L 12/707*    (2013.01)
 *H04L 12/761*    (2013.01)
 *G06F 11/20*     (2006.01)

(52) U.S. Cl.
 CPC .............. *H04L 45/28* (2013.01); *H04L 45/123* (2013.01); *H04L 45/22* (2013.01); *G06F 11/2035* (2013.01); *G06F 11/2048* (2013.01); *H04L 45/16* (2013.01)

(58) Field of Classification Search
 USPC ......................................... 370/216–228, 252
 See application file for complete search history.

(56) References Cited

U.S. PATENT DOCUMENTS

| | | | | |
|---|---|---|---|---|
| 8,040,794 | B2 * | 10/2011 | Eckert et al. | 370/219 |
| 8,046,490 | B1 * | 10/2011 | Wu | 709/238 |
| 8,085,755 | B2 * | 12/2011 | Shepherd | 370/351 |
| 8,369,212 | B2 * | 2/2013 | Howard et al. | 370/225 |
| 2006/0221866 | A1 * | 10/2006 | Shepherd | 370/255 |
| 2006/0233154 | A1 | 10/2006 | Eckert et al. | 370/351 |
| 2010/0271933 | A1 * | 10/2010 | Li et al. | 370/219 |

\* cited by examiner

*Primary Examiner* — Christopher Grey
(74) *Attorney, Agent, or Firm* — Campbell Stephenson LLP

(57) ABSTRACT

Multiple redundant sources for a datastream can be established in a network, where the redundant sources are configured with the same source address. One of the redundant sources provides the datastream to a receiver of a multicast group. If the redundant source fails, another redundant source can be used in its place, ensuring the receiver continues to receive the datastream. A routing element coupled to a redundant source monitors the redundant source for failure and informs the rest of the network of the status of the coupled redundant source. The routing element can inform other routing elements of the status by advertising or withdrawing a route that reaches the coupled redundant source, which the other routing elements can use to update their routing tables.

19 Claims, 7 Drawing Sheets

SOURCE ALIVE ROUTE INJECTION

FIELD OF THE INVENTION

This invention relates generally to fault management, and, more particularly, to fault management of redundant sources.

BACKGROUND

A multicast source (e.g., a server or a host computer) may provide a datastream of multicast packets to a multicast group, or group of receivers (e.g., host computers). A receiver wishing to receive the datastream may request to join the multicast group. In response to the request, a multicast tree, or a branch thereof, is built in the network from the requesting receiver to the source. Packets of the datastream can then be transported on the multicast tree from the source to the receiver.

Failures in the network may prevent the datastream from reaching the receivers of the multicast group. For example, if the source is the only provider of the datastream, failure of the source will result in failure of the datastream reaching the receivers. Source failure can be detected through the use of messages, such as source alive or keep alive messages, transmitted from a source. A source of a datastream can be configured to periodically transmit a keep alive message to a connected device (e.g., a router) in the network to indicate the source's "aliveness." The connected device may determine whether the source has failed, based on the transmission of the keep alive messages to the connected device. A source that successfully transmits the message periodically to the connected device is alive (i.e., the source has not failed). A source that does not successfully transmit the message periodically to the connected device is not alive (i.e., the source has failed). Determining source aliveness from such keep alive messages requires that both the source and the connected device are configured with a protocol that provides for transmission of the keep alive messages between the source and connected device. If the source is not configured to support this explicit messaging scheme, then the connected device cannot detect source failure through such keep alive messages.

Failures in the network may also be addressed using flow-based multicast-only fast re-route (MoFRR). Upon receiving a request from a receiver to join a multicast group, a network implementing MoFRR establishes disjoint primary and secondary paths (e.g., a primary multicast tree and a secondary multicast tree, or branches thereof) from the receiver toward the source, rather than a single path (e.g., a single multicast tree or branch thereof) as established in a non-MoFRR network. Once the disjoint paths are established, packets of the datastream are sent across both disjoint primary and secondary paths toward the receiver. A MoFRR-capable edge router on the receiver edge receives packets from both disjoint paths. The MoFRR-capable edge router forwards the packets received on the primary path to the receiver, while discarding packets of the secondary path. In the event of link failure in the primary path, the MoFRR-capable edge router will switch over to the secondary path, and forward packets from the secondary path to the receiver.

However, MoFRR cannot be used to address source failures in the network, since the two disjoint paths lead back to a single source. If the source itself fails, packets of the datastream cannot be sent across the disjoint paths, and the datastream will fail to reach the receivers. Further, implementing MoFRR is resource expensive, since MoFRR costs double bandwidth in the network in order to duplicate datastream packets that are sent across both disjoint paths through the network.

BRIEF DESCRIPTION OF THE DRAWINGS

A more complete understanding of the present disclosure may be acquired by referring to the following description and the accompanying drawings, in which like reference numbers indicate like features.

Figure 1:
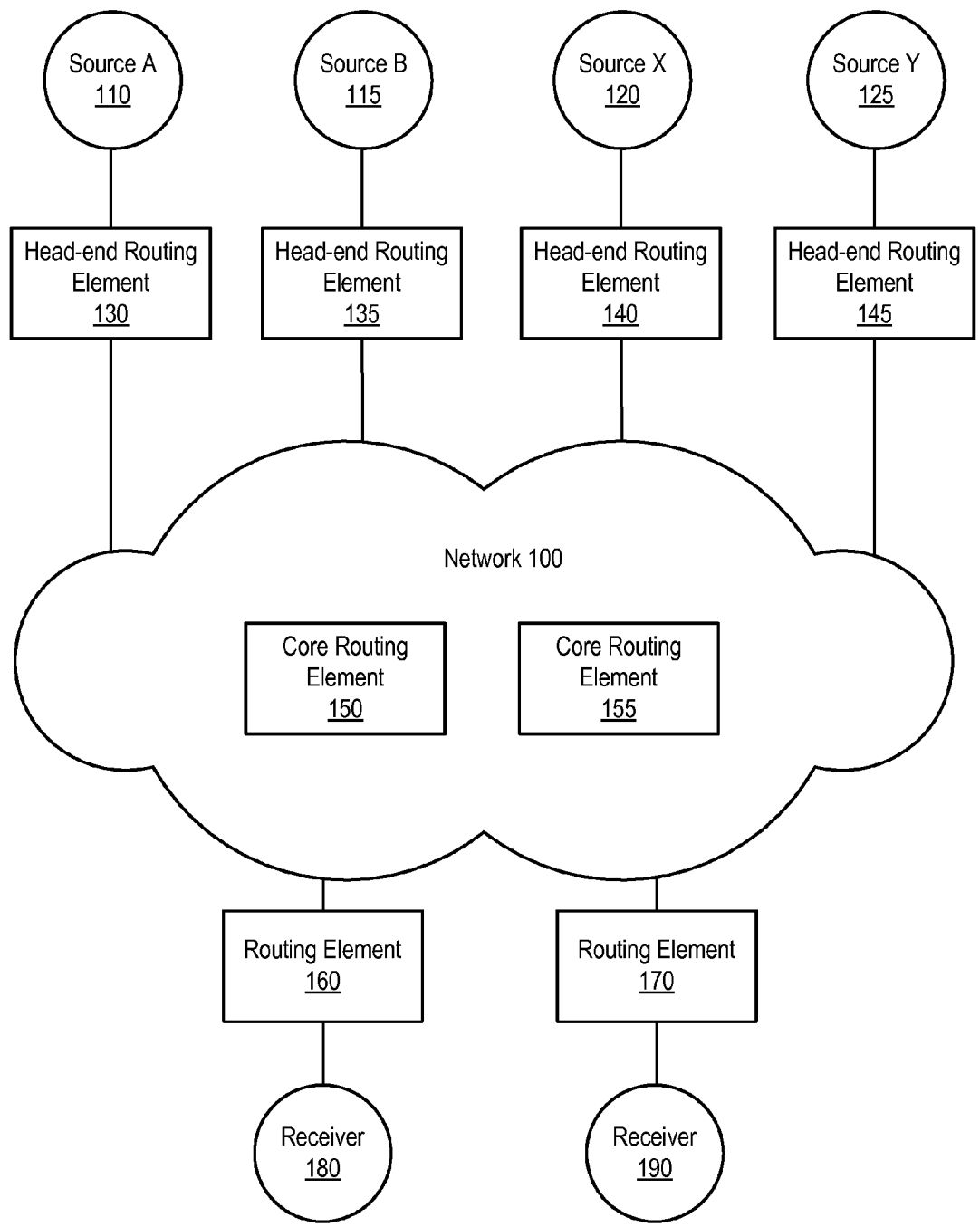
FIG. 1 is a block diagram illustrating relevant components of an example network in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents and alternatives falling within the spirit and scope of the present disclosure as defined by the appended claims.

DETAILED DESCRIPTION

Overview

Failures in a network, such as the failure of a source of a datastream, may stop the datastream from reaching a receiver of a multicast group. To prevent such a disruptive failure, multiple redundant sources for the datastream can be established in the network. One of the redundant sources provides the datastream to the receiver of the multicast group. If that redundant source fails or otherwise becomes unavailable, another redundant source of the datastream can be used in its place. The receiver will continue to receive a single datastream, without requiring multiple instances of the same datastream from each of the redundant sources to be sent through the network. The redundant sources of the datastream are configured with the same source address and each redundant source can provide the datastream using the same multicast group address. Multiple distinct datastreams can be provided in the network, with each distinct datastream being provided by multiple redundant sources.

A network device, also referred to as a head-end routing element, is coupled to a first redundant source. The network device can detect failure of the first redundant source by monitoring the datastream of the first redundant source. If packets of the datastream are received on the network device, the first redundant source is determined to be active. If packets of the datastream are not received on the network device, the first redundant source is determined to be not active. The network device may also determine that the first redundant source is active or inactive based on further evaluation of the received datastream packets, such as whether the datastream packets were received for at least a threshold active time period, whether the datastream packets were not received for at least a threshold inactive time period, or whether the datastream packets meet a performance metric. For example, if the performance metric is satisfied, the redundant source is determined to be active. If the performance metric is not satisfied, the redundant source is determined to be inactive. Performance metrics are further discussed below.

The network device can directly or indirectly inform the rest of the network of the first redundant source's status by advertising or withdrawing a route to the first redundant source. In order for packets to be routed through a network, the network devices in the network gather and exchange route information with each other according to standard routing protocols, such as Border Gateway Protocol (BGP) and Routing Information Protocol (RIP). Route information describes various paths, or routes, in the network by which destinations (e.g., sources) can be reached by the network devices. Each network device performs the exchange of route information by announcing to the other network devices that a destination is reachable by a route, which is also known as advertising the route. For example, if the network device determines that the coupled first redundant source is active, the network device can advertise a first route to the first redundant source by directly or indirectly sending route information about the first route to the other network devices. In one embodiment, this advertising can be accomplished through transmission of a route advertisement message including the route information about the first route to the other network devices. Route information can be propagated throughout the network. A receiving network device may associate the first route with a lifetime, or period of time that the first route is considered valid. The lifetime of the first route may be reset upon receipt of another route advertisement for the first route. Once the lifetime of the first route expires, the first route is considered invalid. The lifetime may be specified by the standard routing protocol.

A network device in the network, which may include a core routing element, implements a standard routing protocol. A network device, such as the core routing element, can be informed of a redundant source's status without requiring any modifications made to the standard operation of the network device. According to a standard routing protocol, a network device stores the route information it receives from other network devices in a routing table. A network device may have more than one routing table. Each entry of a routing table, or route entry, stores route information of a route to a particular destination. If a network device needs to route a packet to a particular destination, the network device can consult a routing table to determine the route the packet should take to the particular destination. Each route entry of a routing table may include a network address (or portion thereof) of the particular destination. Destinations can be identified by an IP (Internet Protocol) address. If a destination is a source providing a multicast datastream, the source can be identified by a multicast source address. IP addresses can be represented as a network address containing a four part dotted-decimal address followed by a slash and a prefix length. The dotted decimal address can be interpreted as a 32-bit binary number that has been broken into four octets. Both IP version 4 and IP version 6 addresses can be represented as a network address. The prefix length is the number of shared initial bits of the dotted decimal address, counting from the most-significant bit of the address. If two route entries contain the same dotted decimal address, the prefix length associated with each dotted decimal address may indicate preference of the routes, where the longest prefix length indicates the more specific, and thus preferred, route. A route entry may also indicate a next hop routing element for the route. A next hop routing element is the next network device along the route toward the destination. A next hop routing element may be identified in a route entry by a next hop address. Alternatively, or in addition to, a next hop routing element may be identified in a route entry by a port identity of a port coupled to the next hop routing element. The route entry may also include route metric information, or a weighting value that is assigned to the route by the standard routing protocol. One example of a weighting value is a hop count, or the number of network devices encountered on the route to the destination. If two routes exist for a destination, the route with a higher hop count indicates a longer path through the network than the route with a lower hop count. As route information for a route is propagated from one routing element to another routing element through the network, the hop count for the route information may be incremented.

A network device can also directly or indirectly announce to the other network devices that a route is no longer valid, which is also known as withdrawing the route. For example, if the network device determines that the first redundant source is no longer active, the network device can withdraw the first route. In one embodiment, this withdrawal can be accomplished through transmission of a route withdrawal message that identifies the first route. The route withdrawal can be propagated throughout the network. In one embodiment, the route entry of the withdrawn route may be removed from a routing table of a network device that receives the route withdrawal. In another embodiment, the route entry of the withdrawn route may be modified to indicate the destination is unreachable, such as increasing the hop count to a number that identifies the unreachable status of the destination. A route may also be withdrawn if the route becomes invalid, such as when a lifetime of a route expires. In one embodiment, the route entry of the invalid route may be modified to indicate the route is invalid, such as increasing the hop count to a number that identifies the route is invalid. The standard routing protocol implemented in the network may determine how a route is withdrawn from a routing table.

A network device may also use routes in a routing table to build a packet transport tree, or branch thereof, toward a source of a datastream. Upon direct or indirect receipt of a request from a receiver to join a multicast group in order to receive a datastream provided by a non-redundant source, the network device may select a route from a routing table that reaches the source. The network device may then send an appropriate join message according to the standard multicast protocol implemented in the network, such as Protocol Independent Multicast (PIM), to the next hop routing element indicated in the selected route entry in support of building a packet transport tree or branch thereof from the requesting receiver to the source. If more than one route entry exists for the source, the network device may select a best route, or optimal route, from the multiple routes to the source according to a route selection policy implemented in the network. The standard routing protocol implemented in the network may define the route selection policy used by the network devices, as configured by a network administrator. For example, a best route may be defined by a route selection policy as the route that has the lowest hop count, or the route that is the shortest path to the destination. A best route may also be defined by a route selection policy as the route associated with the longest prefix length, regardless of the hop count. The standard routing protocol implemented in the network may also provide for storing the best route, rather than multiple routes, to a destination in the routing table.

If the requested datastream is provided by redundant sources, the network device may select, from a routing table, a route that reaches one of the redundant sources upon direct or indirect receipt of the join request. The network device may select a best route from among one of the routes that reach the redundant sources according to a route selection policy implemented in the network. For example, a best route may be defined by a route selection policy as the route associated with the longest prefix length, regardless of hop count. Since the redundant sources of the datastream are identified by the same source address, preference of the redundant sources can be indicated using the prefix length associated with the network address of the redundant sources, where a longer prefix length indicates a greater preference of the redundant source. The route selection policy may also provide that, if the prefix lengths associated with the routes are the same, then the best route is defined as the route with the lowest hop count, or route with the shortest path to a redundant source.

Once the best route is determined, the route entry corresponding to the best route is selected and the network device sends an appropriate join message to the next hop routing element indicated in the selected route entry according to the standard multicast protocol implemented in the network. The join message is sent in support of building a packet transport tree or branch thereof from the requesting receiver to the redundant source that is reachable by the best route. Packets of the datastream provided by the selected redundant source can be transported on the packet transport tree from the selected redundant source to the receiver. If the redundant source of the established packet transport tree fails, the packet transport tree or a branch thereof can be rebuilt to another redundant source providing the same datastream. For example, a network device may receive a route withdrawal for a first redundant source that provides the datastream to a receiver. The network device can fail over to a second redundant source that is active to ensure that the datastream reaches the receiver, where the network device selects a best route to the second redundant source as discussed above.

Example Embodiments

FIG. 1 is a block diagram illustrating relevant components of an example network 100 in which the present disclosure can be implemented. Source A 110 and source B 115 are redundant sources that provide a first datastream that is received by a first multicast group that includes receiver 180 and receiver 190. Sources A 110 and B 115 are identified by the same first source address, and both sources A 110 and B 115 provide the first datastream using the same first multicast group address. Both sources A 110 and B 115 may provide the same content for the first datastream, and each may provide the same multicast packets for the first datastream. Source X 120 and source Y 125 are redundant sources that provide a second datastream that is received by a second multicast group, which may also include receiver 180 and receiver 190. Sources X 120 and Y 125 are also identified by a same second source address, which is distinct from the first source address. Both sources X 120 and Y 125 provide the second datastream using the same second multicast group address, which is distinct from the first multicast group address. Similarly, both sources X 120 and Y 125 may provide the same content for the second datastream, and each may provide the same multicast packets for the second datastream. Source A 110, source B 115, source X 120 and source Y 125 are each coupled to a head-end routing element 130, 135, 140, and 145, respectively. Head-end routing elements 130, 135, 140, and 145 are communicatively coupled via network 100 to core routing elements 150 and 155 and routing elements 160 and 170. Core routing elements 150 and 155 are representative of routing elements located within network 100. Routing element 160 is shown as being coupled to receiver 180 and routing element 170 is shown as being coupled to receiver 190.

Multiple redundant sources for different datastreams, such as sources A 110 and B 115 of the first datastream and sources X 120 and Y 125 of the second datastream, can be established in the network 100. Although not shown, more than two redundant sources can be established to provide each datastream. Each redundant source is connected to a head-end routing element, or a network routing element nearest the redundant source. For example, head-end routing element 130 is connected to source A 110. A head-end routing element may also be connected to more than one redundant source. For example, head-end routing element 130 may be additionally connected to another redundant source of the first datastream or may be connected to another redundant source of the second datastream. The connection between a redundant source and a head-end routing element may be a wired connection or a wireless connection. The head-end routing element monitors the receipt of packets of a datastream transmitted by the connected redundant source. The datastream packets are received on a port of the head-end routing element that is connected to the redundant source.

In one scenario, a redundant source may be located in a separate neighboring network. A head-end routing element in network 100 may be assigned to the out-of-network redundant source (as viewed from network 100). Such an assignment may require the use of static joins to ensure that the packets transmitted from the out-of-network redundant source is received at the head-end routing element. For purposes of the present disclosure, such an out-of-network redundant source is considered to be connected to the assigned head-end routing element.

The present disclosure may be implemented in head-end routing elements (e.g., head-end routing elements 130, 135, 140 and 145) without requiring other core routing elements (e.g., core routing elements 150 and 155) in network 100 to also be configured to monitor the receipt of datastream packets from a redundant source. Thus, the monitoring of the redundant sources does not require any modifications to be made to the standard operation of the core routing elements. Also, each redundant source can be monitored without requiring any modifications made to the standard operation of the redundant source. Each head-end routing element can determine the status of a connected redundant source based on the datastream packets received from the connected redundant source. For example, head-end routing element 130 may determine that source A 110 is active based on continuous receipt of datastream packets from source A 110. In one embodiment, source A 110 may be determined to be active once the datastream packets are received for the duration of a threshold active time period. Head-end routing element 130 may also determine that source A 110 is inactive based on continuous absence, or lack of receipt, of the datastream packets from source A 110. Similarly, source A 110 may be determined to be inactive once the datastream packets are not received for the duration of a threshold inactive time period. Each head-end routing element (e.g., head-end routing elements 130 and 135) determines the status of a connected redundant source independently of other head-end routing elements, of core network devices, and of other redundant sources.

In another embodiment, head-end routing element 130 may determine a connected redundant source's status by evaluating the received datastream packets according to a performance metric. If the performance metric is not satisfied, source A 110 is determined to be inactive. Once the performance metric is satisfied, source A 110 is determined to be active. The performance metric may also be evaluated in conjunction with the threshold active and inactive time periods. For example, source A 110 may be determined to be active once the received datastream packets meet a minimum packet loss metric for the threshold active time period. Packet loss occurs when datastream packets transmitted from the redundant source fail to reach head-end routing element 130. A minimum packet loss metric indicates the permissible amount of packet loss that may occur in the datastream. If the datastream exceeds the minimum packet loss metric, the redundant source may be determined to be inactive.

Other performance metrics may involve, for example, transmission time, error rate, and bandwidth. Transmission time is the amount of time it takes for a datastream packet to leave a redundant source and arrive at head-end routing element 130. If the transmission time of the datastream exceeds a permissible amount of time, the redundant source may be determined to be inactive. An error rate of the datastream, such as a bit error rate or a packet error rate, is the number of altered or incorrectly transmitted bits or packets received in the datastream. If the error rate exceeds a permissible error rate, the redundant source may be determined to be inactive. Bandwidth is a rate measurement of consumed data resources over time, expressed in bits per second. If receipt of the datastream packets consumes less than a permissible amount of bandwidth, the datastream packets are not being successfully received and the redundant source may be determined to be inactive.

Once head-end routing element 130 has determined the status of connected redundant source A 110, the head-end routing element can directly or indirectly inform the rest of the network of the status of source A 110. Each head-end routing element may inform other routing elements in the network periodically of a connected redundant source's status. Alternatively, the head-end routing element may inform the other routing elements only upon a change in status, for example when an active redundant source becomes inactive, or when an inactive redundant source becomes active. In one embodiment, head-end routing elements can inform the network of the connected redundant source's status through the use of route update messages. A route update message may contain a route advertisement message or a route withdrawal message, or possibly both a route advertisement message and a route withdrawal message if such messages are for different routes. Each head-end routing element may also receive route update messages regarding other redundant sources in the network.

For example, if head-end routing element 130 determines that source A 110 is active, head-end routing element 130 can inform the network 100 of source A 110's active status by advertising a first route to source A 110. In one embodiment, the advertising can be accomplished by transmitting a route advertisement message containing route information about the first route to other network devices in the network 100. The route advertisement message indicates to the receiving network devices, such as core routing element 150, that source A 110 is reachable by the first route, and is thus active. Core routing element 150 will update its routing table with the received route information by adding a route entry for the advertised route to the routing table. A route advertisement message may also be received by other network devices in the network, such as head-end routing element 135 and routing element 160, as route information is propagated throughout the network. The other network devices also update their respective routing tables with the received route advertisement message in a manner similar to the updating performed by core routing element 150.

Similarly, once head-end routing element 130 determines that source A110 is inactive, head-end routing element 130 can inform network 100 of source A 110's inactive status by withdrawing the first route. In one embodiment, the withdrawing can be accomplished by transmitting a route withdrawal message containing the first route to other network devices in network 100. The route withdrawal can be propagated throughout the network. The route withdrawal message indicates to a receiving network device, such as core routing element 150, that source A 110 is no longer reachable by the first route. Core routing element 150 will update its routing table with the withdrawal. In one embodiment, the route entry of the first route may be removed from the routing table. In another embodiment, the route entry of the first route may be updated to indicate that source A 110 is unreachable via the first route, such as increasing the hop count of the first route's route entry to a number that identifies the first route as unreachable or invalid. Other network devices, such as such as head-end routing element 135 and routing element 160, may also receive the route withdrawal message, and update their respective routing tables in a manner similar to the core routing element 150.

A network device in network 100, such as core routing element 150, can use the routes in their respective routing tables to build a packet transport tree to transport datastream packets from a redundant source to a receiver, such as receiver 180. For example, core routing element 150 may be communicatively coupled between receiver 180 and the redundant sources. Upon indirect receipt of a request for receiver 180 to join a first multicast group in order to receive multicast packets of a first datastream, core routing element 150 may consult a routing table to select a best route from among routes that reach the redundant sources of the first datastream. The best route is selected according to a route selection policy implemented in the network, based on the route information stored in the route entry of the best route. For example, a routing table may contain multiple routes that lead to multiple redundant sources that are active, where some of the multiple active redundant sources are redundant sources of a single datastream (e.g., source A 110 and source B 115 of the first datastream). The best route may be determined to be a route to source A 110, rather than a route to source B 115. Core routing element 150 can then send an appropriate join message to the next hop routing element indicated in the selected route entry in support of building a packet transport tree or branch thereof along the best route. A packet transport tree or branch thereof may be built from the requesting receiver to the redundant source that is reachable by the best route, for example source A 110. Multicast packets of the first datastream provided by source A 110 are transported on the packet transport tree to receiver 180. Since a packet transport tree or branch thereof is not built from receiver 180 to source B 115, receiver 180 will not receive multicast packets of the first datastream provided by source B 115.

Receiver 190 may also wish to receive multicast packets of the first datastream. Core routing element 155 may be communicatively coupled between receiver 190 and the redundant sources. Upon indirect receipt of a request for receiver 190 to join the first multicast group in order to receive multicast packets of the first datastream, core routing element 155 may consult a routing table to select a best route from among routes that reach the redundant sources of the first datastream. For example, core routing element 155 may determine that the best route is a route to source B 115, rather than a route to source A 110. A packet transport tree or branch thereof may be built from receiver 190 to source B 115, and multicast packets provided by source B 115 can be transported to receiver 190 via the packet transport tree. Since a packet transport tree or branch thereof is not built from receiver 190 to source A 110, receiver 190 will not receive multicast packets of the first datastream provided by source A 110.

Some network topological configurations may result in paths from receivers to redundant sources that include common or shared links. For example, a path from receiver 180 to source A 110 and another path from receiver 190 to source B 115 may both include core routing element 155. If packet transport trees or branches thereof from receiver 180 to source A 110 and from receiver 190 to source B 115 are built along these paths, then core routing element 155 may receive duplicate multicast packets for the first datastream from both source A 110 and source B 115. However, standard multicast protocols currently provide mechanisms to prevent such duplicate traffic. Rather than continuing to receive and forward duplicate multicast packets from both redundant sources A 110 and B 115, a mechanism will inform the head-end routing element of one of the redundant sources (e.g., head-end routing element 130 or 135) to stop forwarding packets to core routing element 155. Core routing element 155 would then forward multicast packets to both receivers 180 and 190 using multicast packets of one of the redundant sources of the first datastream. While one of the head-end routing elements would be instructed to stop forwarding packets, the head-end routing element would not use such instruction in determining whether a connected redundant source was active or not active. Each head-end routing element independently determines whether a connected redundant source is active or inactive based on multicast packets received from the connected redundant source, regardless of forwarding changes that may occur downstream in the network 100.

A network device in network 100, such as core routing element 150, can consult a routing table in the event of a failure of a redundant source, as provided by the standard multicast protocol implemented in the network. For example, source A 110 that provides the first datastream to receiver 180 may fail, causing head-end routing element to transmit a route withdrawal message for the first route, which may be propagated throughout the network. On receipt of the route withdrawal message of the first route, core routing element 150 will withdraw the first route from its routing table. Since the existing packet transport tree or branch thereof to receiver 180 is built on the first route, core routing element 150 may consult a routing table to determine a new best route along which the packet transport tree or branch thereof can be rebuilt to ensure receiver 180 continues to receive the first datastream. Core routing element 150 may also consult a routing table after the route withdrawal message has propagated throughout network 100. Core routing element 150, which supports the packet transport tree that provides the first datastream to receiver 180, can failover from source A 110 to another redundant source of the first datastream, such as source B 115, if the best route is determined to be a second route to source B 115. Core routing element 150 would then participate in rebuilding the packet transport tree or a branch thereof toward source B 115 using the second route. For example, core routing element 150 may send an appropriate join message to the next hop routing element indicated in the route entry of the second route. Once the packet transport tree or branch thereof has been rebuilt, receiver 180 will continue to receive the first datastream, which is now provided by source B 115.

A network device, such as core routing element 150, can also consult a routing table in the event of a failure of a network link to a redundant source. For example, a network link that falls on the first route toward source A 110 may fail. If, due to the network link failure, core routing element 150 fails to receive another route update message for the first route, a lifetime of the first route may expire. Core routing element 150 can then send out a route withdrawal message for the first route to the network. If an existing packet transport tree or branch thereof to a receiver is built on the first route, core routing element 150 may consult a routing table to determine a new best route because the first route is no longer valid. Core routing element 150 may also consult the routing table after the route withdrawal message has propagated throughout network 100. The new best route may be a secondary route to source A 110 or may be a route to a different redundant source that provides the first datastream. Core routing element 150 would then participate in rebuilding the packet transport tree or a branch thereof toward the selected redundant source. For example, core routing element 150 may send an appropriate join message to the next hop routing element indicated in a route entry of a route to the selected redundant source. Once the packet transport tree or branch thereof has been rebuilt, receiver 180 will continue to receive the first datastream, which is now provided by the selected redundant source.

The best route, or optimal route, is selected according to a route selection policy implemented in the network 100. For example, a route selection policy may define a best route to be the route that is associated with the lowest route metric or weighting value, indicating that the best route is the shortest path, and thus the optimal path, to a redundant source for the first datastream. Such a route selection policy can be used to indicate that core routing element 150 should select the route of the redundant source closest to a requesting receiver, such as receivers 180 and 190.

In a network implementing such a "closest source" policy, the best route may differ on each routing element in the network, based on locations of the redundant sources relative to receivers. For example, if source A 110 is the closest redundant source to receiver 180, a first route to source A 110 may be selected as the best route on core routing element 150. A packet transport tree or branch thereof may be rebuilt from receiver 180 to a closest redundant source, where a join message from receiver 180 may be propagated from one routing element to another (e.g., core routing elements 150 and 155) along a route to the closest redundant source. If core routing element 150 indirectly receives a join message from receiver 180, core routing element 150 may participate in rebuilding the packet transport tree or branch thereof toward the closest source. The core routing element 150 may select the first route because a route entry for the first route is associated with the lowest weighting value or hop count in a routing table on core routing element 150. By contrast, source B 115 may be the closest redundant source to receiver 190, meaning a second route to source B 115 may be selected as the best route on core routing element 155 because a route entry for the second route is associated with the lowest weighting value or hop count in the routing table on core routing element 155.

A route selection policy may also define a best route to be the route associated with the longest prefix length, regardless of the route's associated route metric or weighting value. The prefix length can indicate the preference of redundant sources of a datastream, where a route to a redundant source associated with the longest prefix length has greater preference than a route to a redundant source associated with a shorter prefix length. Such a route selection policy can be used to indicate that core routing element 150 should select the route to the redundant source with greatest preference, or longest prefix length. The prefix length of the redundant sources can be configured by a network administrator.

In a network implementing such a "preferred source" route selection policy, the best route may be the route toward a redundant source associated with the greatest preference. For example, a redundant source with the greatest preference (i.e., longest prefix length) may be considered to be a primary redundant source. The route to the primary redundant source would be considered the best route on core routing element 150 since the route is associated with the longest prefix length in a routing table on core routing element 150. The route to the primary redundant source would also be the best route on core routing element 155, since a route entry for the route to the primary redundant source similarly indicates the same prefix length of the primary redundant source.

Another redundant source with the next greatest preference (i.e., next longest prefix) may be considered to be a secondary redundant source. Similarly, the prefix length of the secondary redundant source is the same in both route entries of the secondary redundant source in routing tables on core routing elements 150 and 155. In the event the primary redundant source fails, the route entry of the primary redundant source is withdrawn (meaning the route entry associated with the longest prefix is withdrawn). Core routing elements 150 and 155 can select the route entry with the next greatest preference (i.e., the route entry associated with the next longest prefix), such as the route entry of the secondary redundant source. Core routing elements 150 and 155 can then fail over to the secondary redundant source.

The preferred source policy implemented in the network ensures that once the primary redundant source comes back online and the route of the primary redundant source is added to routing tables on core routing elements 150 and 155, core routing elements 150 and 155 will revert back to the primary redundant source. This occurs because the best route is determined to be a route entry for the primary redundant source, which has the greatest preference (i.e., the route entry associated with the longest prefix length in routing tables on core routing elements 150 and 155).

A route selection policy may also implement both a closest source policy and a preferred source policy to determine the best route. For example, multiple secondary redundant sources of a datastream can be configured to have the same preference (i.e., the route entries of two redundant sources are each associated with the same prefix length). The route selection policy implementing both a closest source policy and a preferred source policy may provide that the best route is the route entry associated with both the longest prefix length and lowest route metric. Other methods of route selection may similarly be configured.

Figure 2:
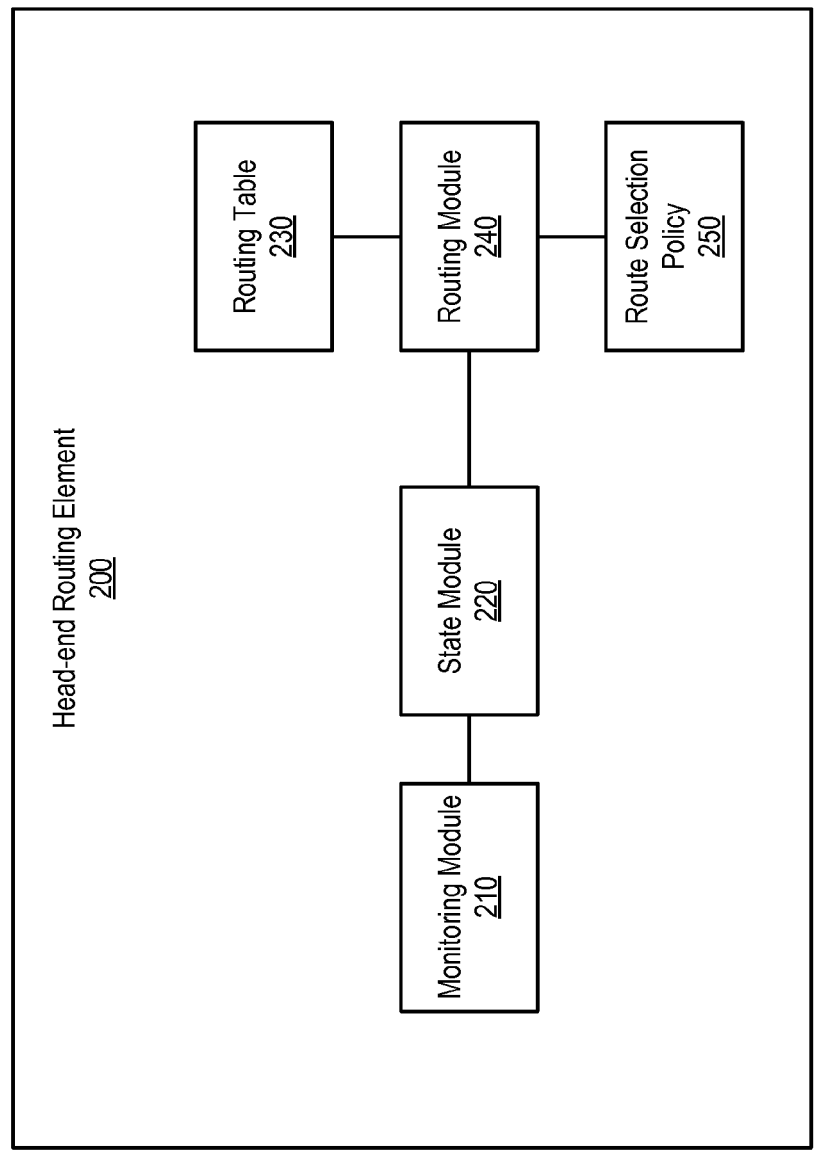
FIG. 2 is a block diagram illustrating relevant components of an example head-end routing element coupled to a redundant source in which the present disclosure can be implemented, according to one embodiment.

FIG. 2 is a block diagram illustrating relevant components of an example head-end routing element 200 (e.g., head-end routing element 130 and head-end routing element 135 of FIG. 1) coupled to a redundant source (e.g., source A 110 and source B 115 of FIG. 1) in which the present disclosure can be implemented. Head-end routing element 200 may be connected to a single redundant source of a datastream (e.g., head-end routing element 130 connected to source A 110). Alternatively, head-end routing element 200 may be connected to more than one redundant source of a datastream, such as source A 110 and source B 115 (not shown). A connection to a redundant source may be wired or wireless.

A monitoring module 210 and a state module 220 are implemented on head-end routing element 200. Monitoring module 210 may be implemented for each redundant source connected to head-end routing element 200. Alternatively, a single monitoring module 210 may be implemented to monitor all redundant sources connected to head-end routing element 200, or to monitor all redundant sources of a single datastream connected to head-end routing element 200. Monitoring module 210 monitors datastream packets received from a connected redundant source by detecting whether the datastream packets have been received on a port of the head-end routing element 200. Monitoring module 210 may also evaluate the datastream packets to determine whether the datastream packets satisfy a performance metric. Monitoring module 210 is coupled to state module 220.

State module 220 provides a mechanism to determine the status of a connected redundant source, based on results of the detecting and evaluating performed by monitoring module 210. If monitoring module 210 determines that datastream packets are received from the redundant source, state module 220 determines whether the datastream packets are received for at least a threshold active time period. Once the datastream packets are received for the duration of the threshold active time period, state module 220 determines that the redundant source is active, or in an UP state. If monitoring module 210 determines that datastream packets are not received from the redundant source, state module 220 determines whether the datastream packets are not received for at least a threshold inactive time period. Once the datastream packets are not received for the duration of the threshold inactive time period, state module 220 determines that the redundant source is inactive, or in a DOWN state.

Similarly, if monitoring module 210 determines that the datastream packets satisfy a performance metric, state module 220 may determine whether the datastream packets satisfy the performance metric for the duration of the threshold active time period. If so, state module 220 determines that the redundant source is active, or in the UP state. If monitoring module 210 determines that the datastream packets do not satisfy a performance metric, state module 220 may determine whether the datastream packets do not satisfy the performance metric for the duration of the threshold inactive period. If so, state module 220 determines that the redundant source is inactive, or in the DOWN state. As discussed above, example performance metrics may involve packet loss of the datastream packets, transmit time of the datastream packets, error rate of the datastream packets, and bandwidth used to receive the datastream packets.

State module 220 is coupled to routing module 240, which implements the standard routing protocol on head-end routing module 200. Routing module 240 may also be implemented on other routing elements in the network, such as core routing elements 150 and 155. Once state module 220 has determined the state or status of the redundant source, state module 220 can inform routing module 240 to generate an appropriate route update message to convey the status to the rest of the network. An example route update message can be a route advertisement message and/or a route withdrawal message. For example, if state module 220 determines that the redundant source is active, state module 220 informs routing module 240 that the redundant source is now active and reachable via a first route. Routing module 240 may then generate a route advertisement message for the first route. Routing module 240 may gather route information describing the first route, in a manner specified by the standard routing protocol. The route information is included in the route advertisement message. If state module 220 determines that the redundant source is inactive, state module 220 informs routing module 240 that the redundant source is now inactive and no longer reachable via the first route. Routing module 240 can then generate a route withdrawal message for the first route. In one embodiment, state module 220 triggers routing module 240 to generate the route update message (such as a route advertisement message or a route withdrawal message) according to the standard routing protocol. Routing module 240 transmits the generated route update message on a port or ports of head-end routing element 200 to other network devices.

Routing module 240 is communicatively coupled to example routing table 230 and route selection policy 250. More than one routing table 230 may be implemented on head-end routing element 200. Route selection policy 250 may be configured on head-end routing element 200 by a network administrator. Route selection policy 250 may be configured on other routing elements in the network, such as core routing elements 150 and 155. Route selection policy 250 may implement a closest source policy, a preferred source policy, or combination thereof. Route selection policy 250 may also implement another policy for determining a best route. Routing module 240 refers to route selection policy 250 when determining a best route from various routes stored in routing table 230.

Routing module 240 may also process route update messages received from other routing elements in the network. For example, upon receipt of a route advertisement message that includes a route to source B 115, routing module 240 may add the route to routing table 230. Similarly, if a route withdrawal including the route to source B 115 is subsequently received, routing module 240 may withdraw the route to source B 115 from the routing table 230. Route update messages received on other routing elements in the network (e.g., core routing elements 150 and 155) may be similarly processed by routing module 240.

Figure 3:
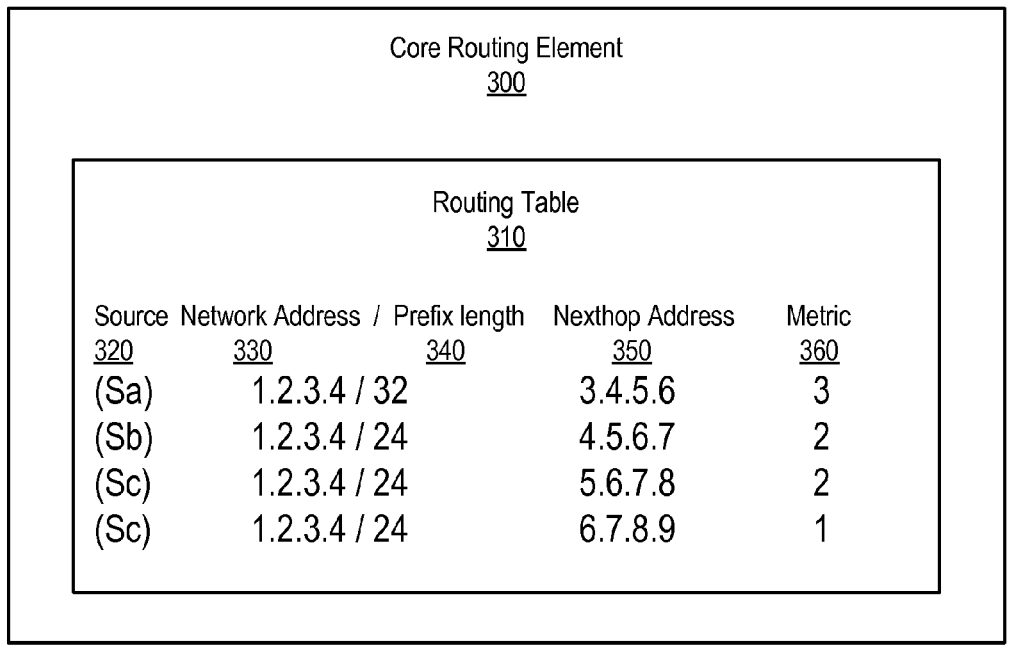
FIG. 3 is a block diagram illustrating relevant components of an example routing table on an example core routing element, according to one embodiment.

FIG. 3 is a block diagram illustrating relevant components of an example routing table 310 on a core routing element 300 (e.g., core routing elements 150 and 155). Although the present disclosure describes updating routing table 310 below, routing tables on other routing elements (e.g., head-end routing elements 130, 135, 140 and 145 and routing elements 160 and 170) may be similarly updated. Routing tables on different routing elements may contain different values than those shown in example routing table 310. For example, a routing table 310 on core routing element 150 may contain different values and route information than a routing table 310 on core routing element 155.

In response to receiving a route advertisement message including route information of a first route to a first redundant source, core routing element 300 will update a routing table 310 with the route information. For example, route information for a first route to source A 110 may be received by core routing element 300. If the first route to source A 110 is not presently stored in a route entry in routing table 310, core routing element 300 will create a new route entry in routing table 310 for the first route, in which the core routing element 300 stores the route information of the first route. The route entry may include a network address 330 of the redundant source. Routing table 310 illustrates four route entries for three redundant sources of the first datastream: source A 110 (Sa), source B 115 (Sb) and source C (Sc, not shown in FIG. 1). Source C is reachable by two routes, as viewed from core routing element 300. Since the redundant sources have the same source address, route entries in routing table 310 for each redundant source 320 will include the same dotted decimal address (e.g., 1.2.3.4). An identity 320 of each redundant source is provided in the example routing table 310 to clarify which redundant source is being described by each route entry. A routing table 310 need not include the identity 320 of a redundant source in a route entry. A routing table 310 may also include additional or alternative information, such as a port identification that identifies a port on which an associated route advertisement message is received.

The route entry may also include a prefix length 340 of the network address 330. As discussed above, the prefix length can be used to implement preference of redundant sources, where the best route is the route associated with the longest prefix length, regardless of the weighting metric. In the example routing table 310, the route entry for source A 110 has the longest prefix length of 32, indicating that source A 110 is the redundant source with the greatest preference. Source A 110 could also be considered the primary redundant source for the first datastream. If core routing element 300 indirectly receives a join message from a requesting receiver, core routing element 300 may send a join message toward a redundant source on the best route. If a preferred source policy is implemented in the network, a route to primary redundant source A 110 can be selected as the best route.

Each route entry may also indicate a next hop routing element by identifying a next hop address 350 of the next hop routing element. The next hop routing element could also, or alternatively, be identified by a port identification that identifies a port to which the next hop routing element is connected. Each route entry may also include a weighting metric 360. The next hop address 350 is an address of the next network device along the route toward the redundant source. Weighting metric 360 is a route metric assigned to the route by the standard routing protocol implemented in the network. Weighting metric 360 may be a hop count, or number of network devices that are encountered on the route toward the redundant source. As discussed above, a weighting metric can be used to implement preference of the closest redundant source, where the best route is the route associated with the least weighting metric. In the example routing table 310, the last route entry for source C has the least number of hops at 1, indicating that source C is the closest redundant source to core routing element 300. If core routing element 300 indirectly receives a join message from a requesting receiver, core routing element 300 may send a join message on the best route. The route to source C that is associated with the least weighting metric can be selected as the best route, if a closest source policy is implemented in the network.

If both preferred source and closest source policies are implemented in the network, the route associated with the longest prefix length may be selected as the best route. If the route with the longest prefix length is withdrawn from the routing table or if multiple route entries have the same prefix length, the best route can be determined using the weighting metric. If the route to source A is withdrawn from example routing table 310, a new best route is selected from among the remaining routes. Since source B and source C have the same prefix length 24 (indicating both sources are secondary redundant sources), the best route can be selected according to the weighting metric. In example routing table 310, the route to source C that is associated with the least weighting metric, 1, can be selected as the best route. Other route selection policies may also be implemented, using route information in the routing table to select the best route according to the implemented policy.

Figure 4:
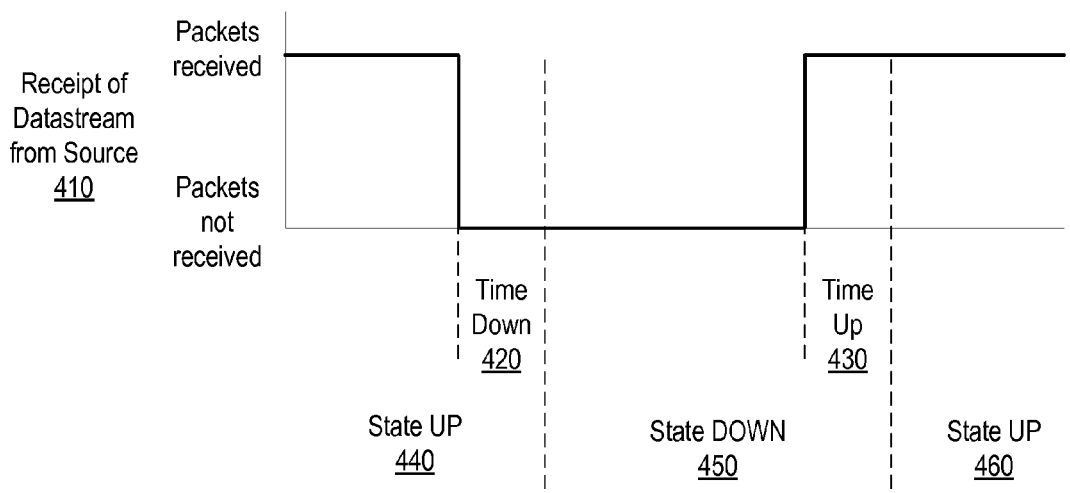
FIG. 4 is a graph illustrating example state transitions of a redundant source, according to one embodiment.

FIG. 4 is a graph illustrating example state transitions of a monitored redundant source. Packets of a datastream provided by the redundant source are received on head-end routing element 200 from a redundant source. Receipt of datastream packets from the redundant source can be used by monitoring module 210 on head-end routing element 200 to determine whether the redundant source is active or inactive, according to the different embodiments discussed above. The high level illustrated in the graph of FIG. 4 indicates packets of the datastream 410 are successfully received on head-end routing element 200. The low level illustrated in the graph indicates packets of the datastream 410 are not successfully received on head-end routing element 200. Thus, the high level indicates that the redundant source is active and the low level indicates that the redundant source is inactive. In one embodiment, the high level may also indicate that the datastream packets satisfy a performance metric. Similarly, the low level may also indicate that the datastream packets do not satisfy a performance metric.

Transition of a state of a redundant source may be determined based on the datastream packets received at head-end routing element 200. Receipt of the datastream packets 410 is illustrated as beginning at a high level, transitioning to a low level, and then transitioning back to a high level. For example, the high level indicates that datastream packets are being received successfully, and that the redundant source is active, or in an UP state 440. When the receipt of datastream packets 410 transitions from the high level to the low level, the state of the redundant source may not be immediately transitioned to a DOWN state. As discussed above, datastream packets may need to be received at the low level for the duration of a threshold inactive time period, or time down 420, before the redundant source can be determined to be inactive. Once time down 420 has passed or expired, the UP state 440 of the redundant source transitions to a DOWN state 450.

Similarly, when receipt of the datastream packets 410 transitions from the low level back to a high level, the state of the redundant source may not be immediately transitioned to an UP state. Datastream packets may need to be received at the high level for the duration of a threshold active time period, or time up 430, before the redundant source can be determined to be active. Once time up 430 has passed or expired, the DOWN state 450 of the redundant source transitions to an UP state 460.

Figure 5:
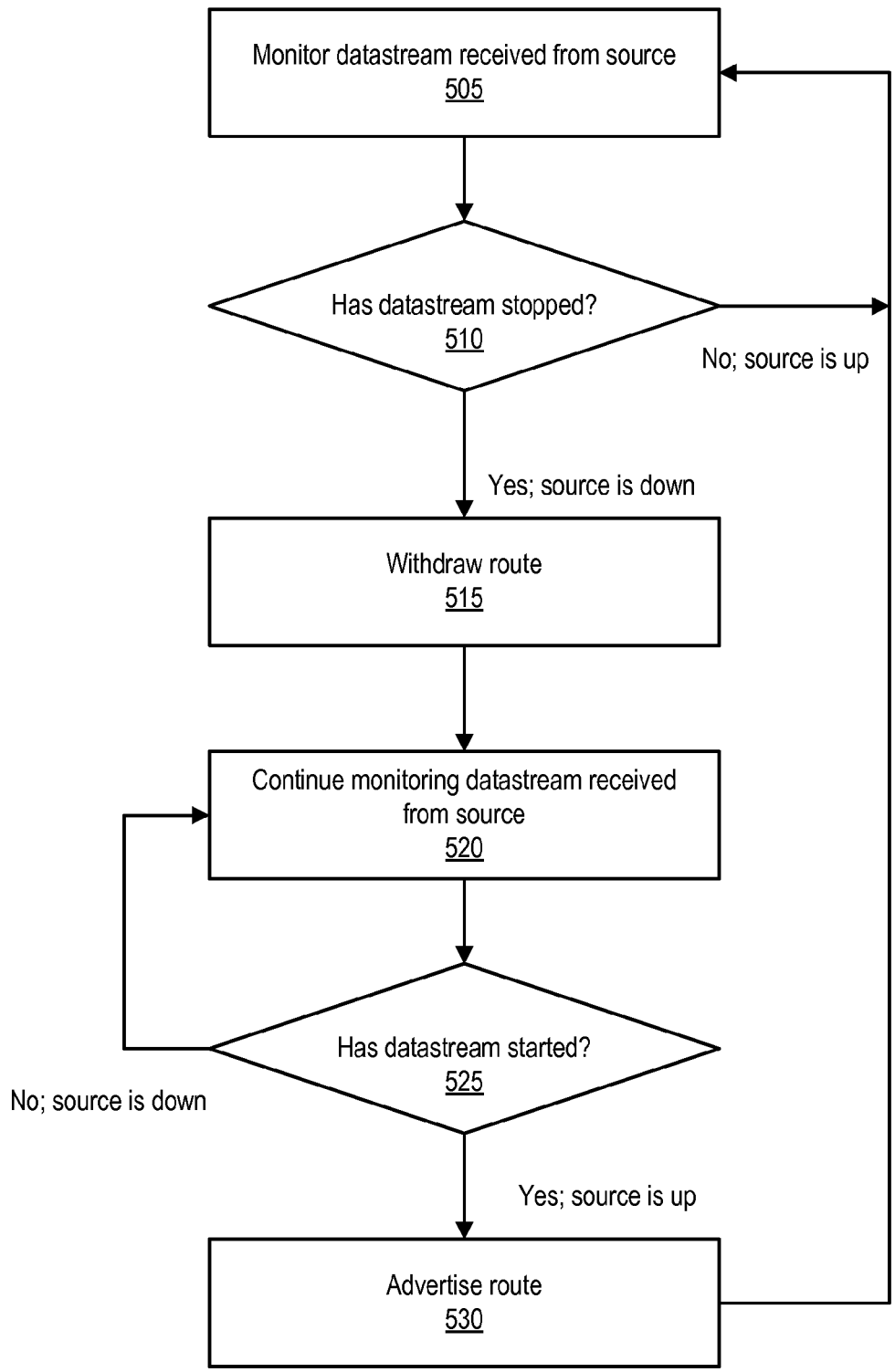
FIG. 5 is a flow chart illustrating relevant acts of an example process implemented by a head-end routing element coupled to a redundant source, according to one embodiment.

FIG. 5 is a flow chart illustrating relevant acts of an example process implemented by a head-end routing element 200 that is coupled to a redundant source. The process begins with operation 505, monitoring a datastream received from a redundant source. The datastream packets are sent by the redundant source and received on a port of head-end routing element 200. Operation 505 can be performed by detecting that datastream packets are being received from a redundant source on a port coupled to the redundant source.

The process continues to operation 510, determining whether the datastream has stopped. Operation 510 can be performed periodically or continuously. The determination of whether the datastream has stopped depends upon how the datastream is evaluated, according to the different embodiments discussed above. For example, the determination may be based upon whether datastream packets have or have not been received for a threshold amount of time or whether the packets have or have not met a performance metric. If the datastream packets are received for at least a threshold active time period, the redundant source is determined to be in an active UP state, and the process returns to monitoring operation 505. If the datastream packets are not received for at least a threshold inactive time period, the redundant source may be determined to be in an inactive DOWN state, and the process continues to operation 515, where the route is withdrawn.

After the route is withdrawn, the process continues to operation 520, monitoring the datastream received from the coupled redundant source. At this point, since the redundant source is in a DOWN state, the datastream packets may be received at the routing element intermittently, or may not be received at all. Thus, the process may monitor the port that is connected to the redundant source to detect if any datastream packets have been received. The process may alternatively, or in addition to, determine if the datastream packets fail to satisfy a performance metric.

The process continues to operation 525 and determines whether the datastream has started. Operation 525 can be performed periodically or continuously. Like operation 510, the determination of whether the datastream has started depends upon how the datastream is evaluated, according to the different embodiments discussed above. For example, if packets of the datastream are not detected at the port for at least a threshold inactive time period (i.e., packets are not being received), the redundant source is determined to be in an inactive DOWN state, and the process returns to operation 520. If packets of the datastream are detected at the port for at least a threshold active time period (i.e., packets are being received), the redundant source is determined to be in an active UP state, and the process continues to operation 530, where the route is advertised. After advertising the route, the process returns to operation 505 and begins monitoring the datastream received from the redundant source.

Figure 6:
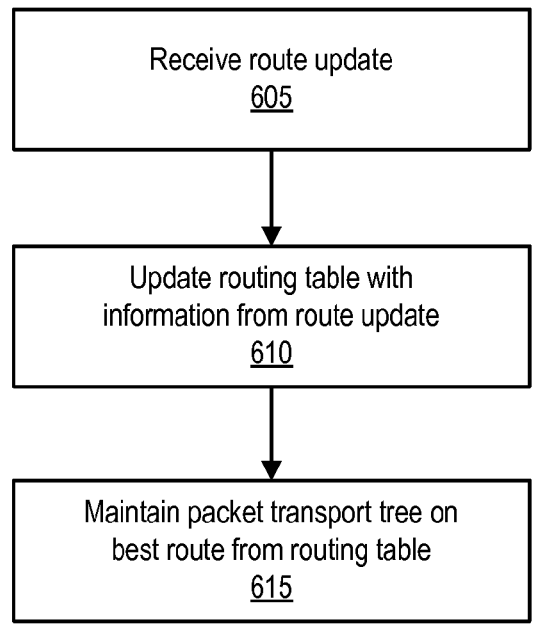
FIG. 6 is a flow chart illustrating relevant acts of an example process implemented by a core routing element upon receipt of a route update message, according to one embodiment.

FIG. 6 is a flow chart illustrating relevant acts of an example process implemented by a core routing element 300 (e.g., core routing elements 150 and 155) upon receipt of a route update message. This process can also be implemented by other routing elements in the network upon receipt of a route update message.

The process begins with operation 605 on receipt of a route update message. According to the different embodiments discussed above, the route update message may include a route advertisement and/or a route withdrawal of a route to the redundant source. In response to receiving the route update, the process continues to operation 610, where a routing table is updated with the route update message. For example, if the route update message is a route advertisement message of a new route not presently contained in routing table 310, a new entry including the new route to a redundant source is added to routing table 310. The new entry may include the route information contained in the route advertisement message, such as the network address 330 of the redundant source, a prefix length 340, a next hop address 350, and route metric 360. If the route update message is a route withdrawal message of a route contained in routing table 310, the route is withdrawn from routing table 310. The route may be withdrawn by removing the entry including the route from routing table 310 or by modifying the entry including the route to indicate that the route has been withdrawn.

The process continues to operation 615, where a packet transport tree is maintained on a best route selected from routing table 310. According to the embodiments discussed above, the best route may be selected from routing table 310 based on the route selection policy implemented in the network. If the best route changes due to the updating of operation 610, the packet transport tree or a branch thereof is rebuilt on the new best route. If the best route does not change after the updating of operation 610, the packet transport tree may not be changed.

Figure 7:
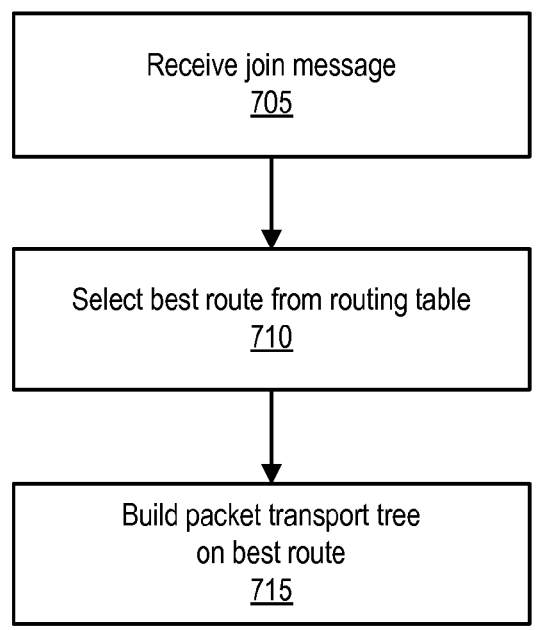
FIG. 7 is a flow chart illustrating relevant acts of an example process implemented by a core routing element upon receipt of a join message, according to one embodiment.

FIG. 7 is a flow chart illustrating relevant acts of an example process implemented by a core routing element 300 upon receipt of a join message. This process can also be implemented by other routing elements in the network upon receipt of a join message.

The process begins at operation 705 on receipt of a join message. The join message may be received at core routing element 300 in support of building a packet transport tree between a redundant source (e.g., source A 110) and a receiver (e.g., receiver 180). In response to receiving the join message, the process continues to operation 710, where the best route is selected from routing table 310 based on the route selection policy implemented in the network.

The process then continues to operation 715, where the core routing element builds a packet transport tree on the selected best route. Performance of operation 715 may include sending or forwarding a join message to the next hop routing element associated with the selected best route toward the redundant source on the best route in support of building the packet transport tree. Once the packet transport tree is established, the core routing element will maintain the packet transport tree on the best route according to the process detailed in FIG. 6.

Figure 8:
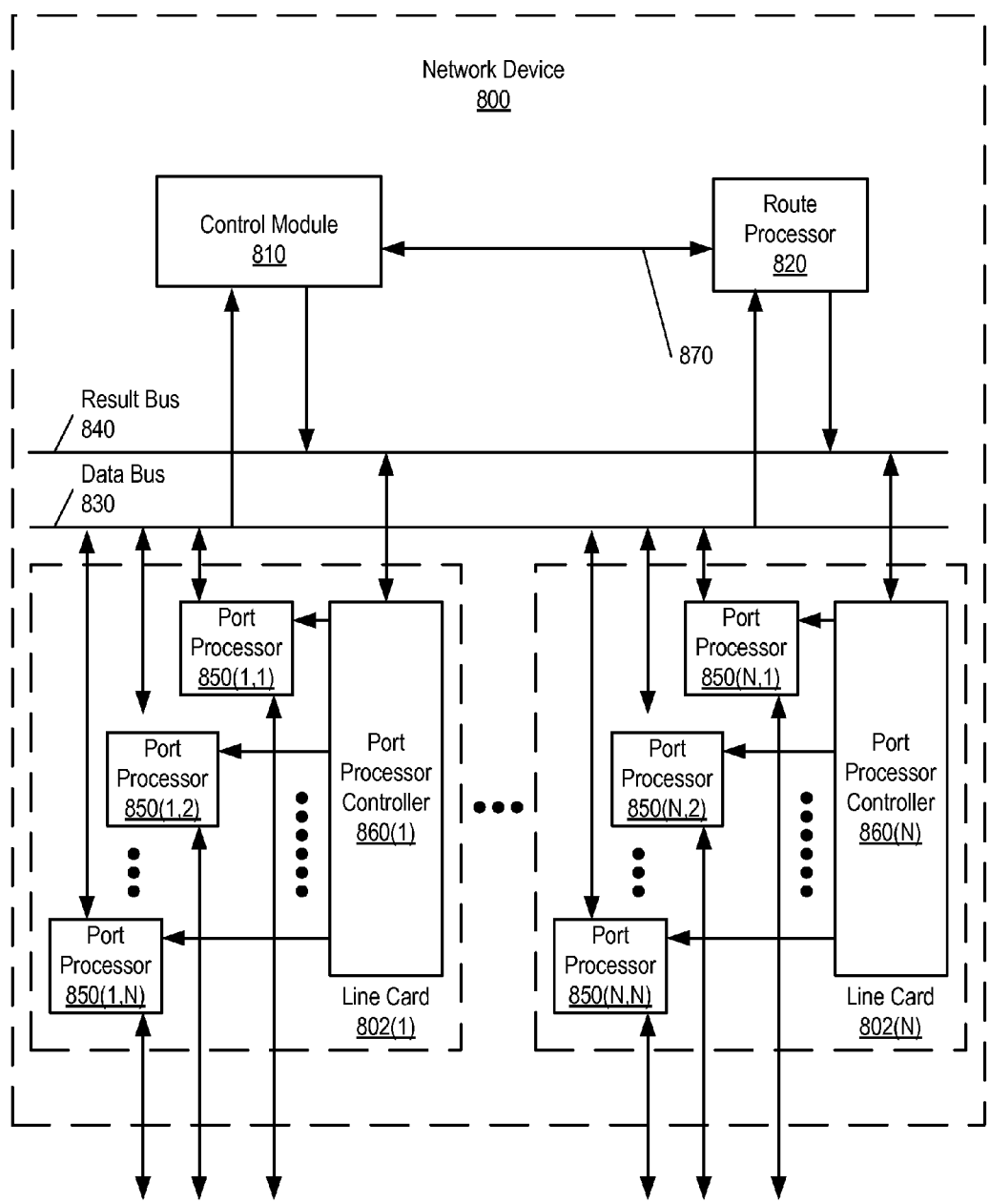
FIG. 8 is a block diagram illustrating relevant components of an example network device in which the present disclosure can be implemented, according to one embodiment.

FIG. 8 is a block diagram illustrating relevant components of an example network device 800 (e.g., head-end routing element 130 and 135 or core routing elements 150 and 155 of FIG. 1) in which the present disclosure can be implemented. In this depiction, network device 800 includes a number of line cards (line cards 802(1)-802(N)) that are communicatively coupled to a control module 810 (which can include a forwarding engine, not shown) and a route processor 820 via a data bus 830 and a result bus 840. Line cards 802(1)-(N) include a number of port processors 850(1,1)-850(N,N) which are controlled by port processor controllers 860(1)-860(N). It will also be noted that control module 810 and route processor 820 are not only coupled to one another via data bus 830 and result bus 840, but are also communicatively coupled to one another by a communications link 870. In alternative embodiments, each line card can include its own forwarding engine.

When a message (e.g., route update message or join message) is received, the message is identified and analyzed by a network device such as network device 800 in the following manner. Upon receipt, a message (or some or all of its control information) is sent from one of the port processors 850(1,1)-850(N,N) at which the message was received to one or more of those devices coupled to data bus 830 (e.g., others of port processors 850(1,1)-850(N,N), a forwarding engine, and/or route processor 820). Handling of the message can be determined, for example, by a forwarding engine. For example, a forwarding engine may determine that the message should be forwarded to one or more of port processors 850(1,1)-850(N,N). This can be accomplished by indicating to corresponding one(s) of port processor controllers 860(1)-860(N) that the copy of the message held in the given one(s) of port processors 850(1,1)-850(N,N) should be forwarded to the appropriate one of port processors 850(1,1)-850(N,N).

Network device 800 can be configured to implement monitoring module 210 and state module 220 (e.g., in control module 810, or in one of port processor controllers 860(1)-860(N) and/or in route processor 820) in order to monitor datastream packets received from a coupled redundant source device. Network device 800 can thus implement the process illustrated in FIG. 5. A network device 800 in the network, such as core routing elements 150 and 155, may not be configured to implement monitoring module 210 and state module 220.

Network device 800 can also be configured with a route selection policy (e.g., in control module 810, or in one of port processor controllers 860(1)-860(N) and/or in route processor 820). Such a route selection policy can be implemented in a network and can be used to select a best route from a routing table.

Figure 9:
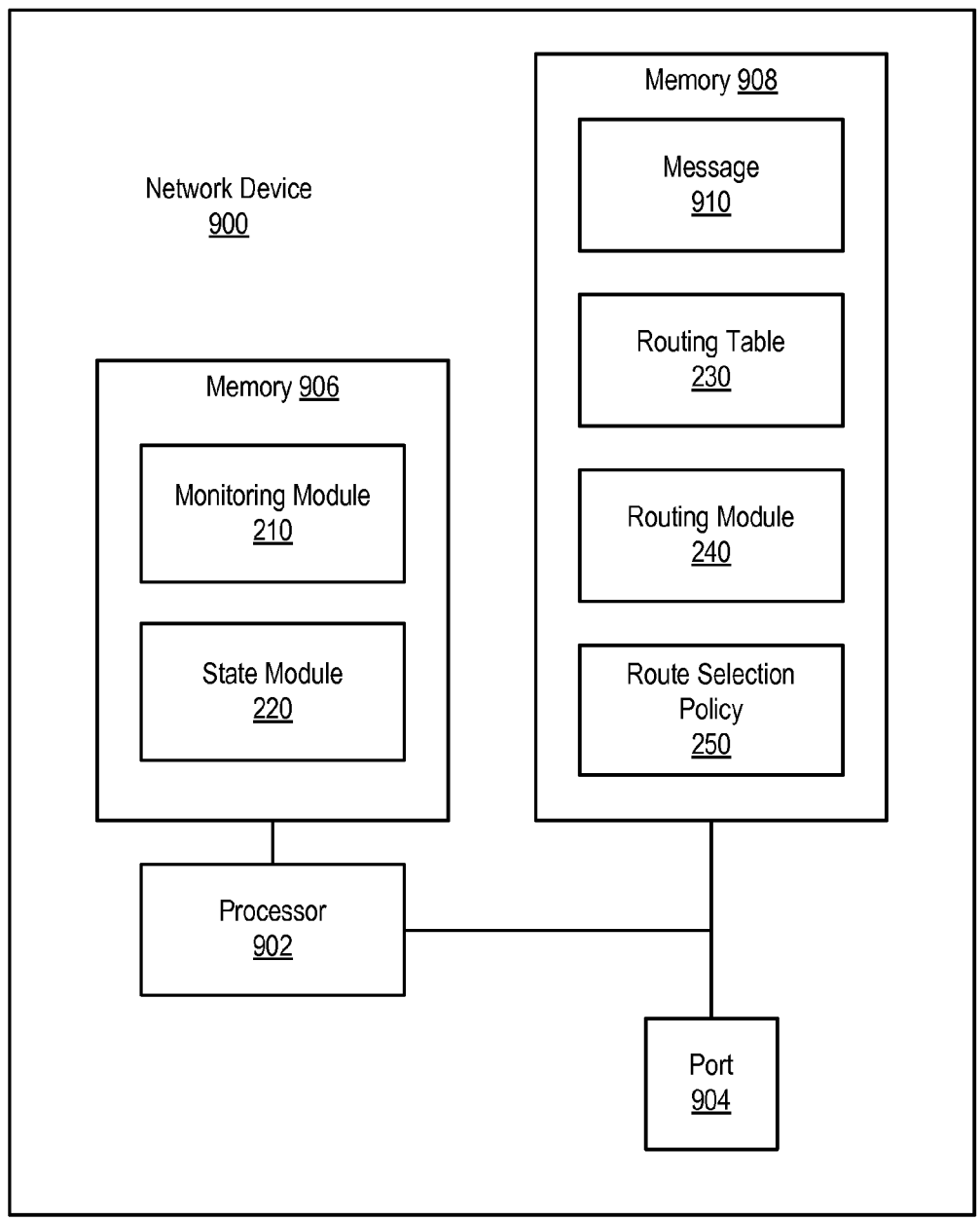
FIG. 9 is a block diagram illustrating relevant components of an example network device in which the present disclosure can be implemented, which illustrates how the present disclosure can be implemented in software, according to one embodiment.

FIG. 9 is a block diagram illustrating relevant components of an example network device, illustrating how monitoring module 210 and state module 220 can be implemented in software. As illustrated, network device 900 includes one or more processors 902 (e.g., microprocessors, PLDs (Programmable Logic Devices), or ASICs (Application Specific Integrated Circuits)) configured to execute program instructions stored in memories 906 and/or 908. Memories 906 and 908 can include various types of RAM (Random Access Memory), ROM (Read Only Memory), Flash memory, MEMS (Micro Electro-Mechanical Systems) memory, and the like. Network device 900 also includes one or more ports 904 (e.g., one or more hardware ports or other network interfaces that can be linked to other network devices, hosts, servers, storage devices, or the like). Processor 902, port 904, and memories 906 and 908 are coupled to send and receive data and control signals by one or more buses or other interconnects.

In this example, program instructions executable to implement monitoring module 210 and state module 220 are stored in memory 906. Monitoring module 210 and state module 220 include the functionality needed to perform the process illustrated in FIG. 5. Route selection policy 250 can be stored in memory 908, along with routing table 230 and routing module 240.

Various messages like message 910, including messages like a route update message including a route advertisement message and/or a route withdrawal message, and a subscription request for a downstream receiver (e.g., a join message) can be stored in memory 908. Other messages can also be stored in memory 908. These messages can be stored in memory 908 prior to being sent on a network via port 904 and/or in response to being received from a network via port 904.

The program instructions and/or data executable to implement monitoring module 210 can be stored on various computer readable storage media such as a memory (e.g., RAM (Random Access Memory)). In some embodiments, such software is stored on a computer readable storage medium such as a CD (Compact Disc), DVD (Digital Versatile Disc), hard disk, optical disk, tape device, floppy disk, and the like). In order be executed, the software is loaded into memory from another computer readable storage medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

Although the present disclosure has been described with respect to specific embodiments thereof, various changes and modifications may be suggested to one skilled in the art. It is intended such changes and modifications fall within the scope of the appended claims.

What is claimed is:

1. A method comprising:
monitoring whether datastream packets are received from a first redundant source, wherein
the monitoring is performed by a head-end router, and
the head-end router is connected to the first redundant source and coupled to a network; and
advertising a first route to the network, in response to receipt of the datastream packets from the first redundant source, wherein
the advertising is performed by the head-end router,
the receipt of the datastream packets is an indication that the first redundant source is active, and
the first redundant source is reachable by the first route;
receiving an advertisement for a second route to a second redundant source, wherein the first and second redundant sources share a common address but distinct prefix lengths;
updating a routing table with the first and the second routes; and
selecting a best route, wherein the best route is selected from the routing table according to a selection policy.

2. The method of claim 1, further comprising:
subsequent to the indication that the first redundant source is active,
determining that the first redundant source becomes inactive, in response to detection of a lack of the datastream packets; and
withdrawing the first route, in response to the determining that the first redundant source becomes inactive.

3. The method of claim 1, wherein
the advertising the first route is performed in response to detecting that the datastream packets are received from the first redundant source for a duration of a threshold active time.

4. The method of claim 2, wherein the determining that the first redundant source becomes inactive further comprises
detecting that the datastream packets are not received from the first redundant source for a duration of a threshold inactive time.

5. The method of claim 1, wherein
the advertising the first route is performed in response to evaluating that the datastream packets satisfy a performance metric.

6. The method of claim 2, wherein the determining that the first redundant source becomes inactive further comprises:
evaluating that the datastream packets fail to satisfy a performance metric.

7. The method of claim 6, wherein the performance metric comprises one of a minimum transmit time, a minimum packet loss metric, a minimum error rate, and a minimum bandwidth.

8. The method of claim 1, further comprising:
receiving a route update for the second route to the second redundant source, wherein
a packet transport tree for a downstream receiver currently uses the second route;
updating the routing table with the route update for the second route.

9. The method of claim 1, wherein
the selection policy indicates that a route to a preferred redundant source is the best route,
preference of redundant sources is indicated by a prefix length associated with a route of a redundant source, and
a longest prefix length indicates the route to the preferred redundant source.

10. The method of claim 1, wherein
the selection policy indicates that a route to a closest redundant source to a receiver is the best route,
distance is indicated by a route weighting metric associated with a route of a redundant source, and
a least route weighting metric indicates the route to the closest redundant source.

11. The method of claim 8, further comprising
maintaining the packet transport tree on the best route.

12. The method of 1, further comprising:
receiving a join message for a downstream receiver;
selecting the best route in response to receiving the join message, wherein
the best route comprises one of the first route and the second route, and
the best route is selected in support of building a packet transport tree between one of the first and second redundant sources and the downstream receiver.

13. An apparatus comprising:
a first router comprising
a processor;
a first port configured to be connected to a first redundant source and configured to receive datastream packets from the first redundant source;
a second port configured to be coupled to a network; and
a memory coupled to the processor, the first port, and the second port, the memory configured to store instructions executable by the processor, the instructions configured to implement
a monitoring module configured to detect whether the datastream packets are received on the port, and
a state module configured to
trigger generation of a route advertising message comprising a first route, in response to receipt of the datastream packets from the first redundant source, wherein
the route advertising message is advertised to the network,
the receipt of the datastream packets is an indication that the first redundant source is active, and
the first redundant source is reachable by the first route;
a second router comprising:
a second processor;
a second memory coupled to the second processor and configured to store instructions executable by the second processor to implement:
receiving the advertisement for the first route and an advertisement for a second route to a second redundant source, wherein the first and second redundant sources share a common address but distinct prefix lengths;
updating a routing table with the first and the second routes; and
selecting a best route, wherein the best route is selected from the routing table according to a selection policy.

14. The apparatus of claim 13, wherein
the state module is further configured to, subsequent to the indication that the first redundant source is active,
determine that the first redundant source becomes inactive, in response to detection of a lack of the datastream packets, and trigger generation of a route withdrawal for the first route, in response to the determination that the first redundant source becomes inactive.

15. The apparatus of claim 14, wherein
the state module is configured to trigger generation of the route advertising message by being further configured to
determine that the datastream packets are received from the first redundant source for a threshold active time, and
the state module is configured to determine that the first redundant source becomes inactive by being further configured to
determine that the datastream packets are not received from the first redundant source for a threshold inactive time.

16. The apparatus of claim 14, wherein
the monitoring module is further configured to
evaluate whether the datastream packets received from the first redundant source satisfy a performance metric,
the state module is configured to trigger generation of the route advertising message by being further configured to
determine the datastream packets satisfy the performance metric for a threshold active time, and
the state module is configured to determine the first redundant source becomes inactive by being further configured to
determine the datastream packets fail to satisfy the performance metric for a threshold inactive time.

17. The apparatus of claim 14, the second router further comprising:
a routing module configured to
receive a route update for the second route, wherein
a packet transport tree for a downstream receiver currently uses the second route,
update the routing table with the route update for the second route,
wherein
the best route is selected from the routing table according to a selection policy.

18. The apparatus of claim 14, the second router further comprising:
a routing module configured to
receive a join message for a downstream receiver,
select the best route to a redundant source from a routing table according to a selection policy, wherein
the best route comprises one of the first route to the first redundant source and a second route to a second redundant source, and
the best route is selected in support of building a packet transport tree between one of the first and second redundant sources and the downstream receiver.

19. The method of claim 1, wherein
a second head-end router is configured to be connected to the second redundant source and configured to be coupled to the network,
the second head-end router is configured to advertise the second route to the network.

* * * * *